United States Patent

King et al.

[15] 3,696,255

[45] Oct. 3, 1972

[54] BINARY DATA HANDLING SYSTEM

[72] Inventors: Chia-Cheng King, Thousand Oaks; Arnold J. Jorgensen, San Jose; Michael I. Behr, South Pasadena, all of Calif.

[73] Assignee: Burroughs Corporation, Detroit, Mich.

[22] Filed: Nov. 2, 1970

[21] Appl. No.: 86,324

Related U.S. Application Data

[60] Division of Ser. No. 888,144, Dec. 29, 1969, abandoned, which is a continuation-in-part of Ser. No. 668,319, Sept. 18, 1967, abandoned.

[52] U.S. Cl. ..................307/241, 307/247, 307/255, 307/273, 328/110, 307/218, 340/174.1

[51] Int. Cl. ............................................H03k 17/16

[58] Field of Search................328/109, 110, 140, 73; 307/273, 246, 247, 255, 241, 215, 218; 340/174.1

[56] References Cited

UNITED STATES PATENTS

| | | | |
|---|---|---|---|
| 3,020,483 | 2/1962 | Losee | 328/110 |
| 3,148,334 | 9/1964 | Danielsen et al. | 328/110 X |
| 3,368,152 | 2/1968 | Jorgensen | 328/140 |
| 3,456,554 | 7/1969 | Goodwin | 307/247 |

*Primary Examiner*—John S. Heyman
*Attorney*—Christie, Parker & Hale

[57] ABSTRACT

Phase encoded binary data is recorded on a storage medium such as magnetic tape. In reading the data from the medium, a read signal is produced that includes data pulses at regular intervals and phase pulses between at least some of the data pulses. Upon the occurrence of each data pulse, a blanking pulse of shorter duration than the interval between data pulses is generated. The read signal is transmitted to a utilization circuit only in the absence of blanking pulses. As the interval between data pulses changes due to variations in transport speed of the medium, the width of the blanking pulses changes proportionately so the ratio of the duration of the blanking pulses to the interval between data pulses remains constant. Specifically, the blanking pulses are generated by a monostable multivibrator that is triggered by the data pulses produced in reading. The duration of the quasi-stable state of the multivibrator is controlled by a direct-current voltage derived from the multivibrator output.

12 Claims, 5 Drawing Figures

INVENTORS.
CHIA-CHENG KING
ARNOLD JORGENSEN
MICHAEL I. BEHR
BY Christie, Parker & Hale
ATTORNEYS.

INVENTORS.
CHIA-CHENG KING
ARNOLD JORGENSEN
MICHAEL I BEHR

BY Christie, Parker & Hale
ATTORNEYS.

BINARY DATA HANDLING SYSTEM

CROSS-REFERENCE TO RELATED APPLICATIONS

This application is a division of copending application Ser. No. 888,144, filed on Dec. 29, 1969, and now abandoned, which was a continuation of application Ser. No. 668,319, filed Sept. 18, 1967, and now abandoned.

BACKGROUND OF THE INVENTION

This invention relates to phase encoded binary data handling and, more particularly, to the recovery of phase encoded binary data from a storage medium.

The phase modulation encoding or double-pulse technique is commonly employed to record binary data on a storage medium, particularly magnetic tape. As described in Chapter 7 of the text book, "Digital Computer Components and Circuits" by R. K. Richards, 1957, D. Van Nostrand Company, Inc., such phase encoded binary data includes two pulses of opposite polarity in each bit cell, i.e., the position on the magnetic tape occupied by each bit of binary data. One binary value is represented by a positive pulse followed by a negative pulse in a bit cell, while the other binary value is represented by a negative pulse followed by a positive pulse in a bit cell. The phase encoding technique, which is applicable to both return-to-zero type pulses and non-return-to-zero type pulses, can be employed to particular advantage in a data handling system that records binary data at high bit densities.

Even though phase encoding facilitates the utilization of high bit densities on magnetic tape and the like, variations in tape transport speed and pulse crowding on the tape still present a problem at high bit densities. Tape speed variations, which are usually gradual and of long time duration, and pulse crowding, which is generally a sudden and short time effect, give rise to an uncertainty in the time of occurrence of the bits of binary data as the tape is being read.

One way of recovering phase encoded data involves the use of clock pulses to sample the phase encoded signal read from the tape. In order to establish the proper time relationship between the clock pulses and the phase encoded data recorded on the tape, the clock pulses are recorded in a special channel on the tape reserved for that purpose. This, of course, reduces the area of tape on which data can be recorded and, accordingly, offsets to some extent the added storage capacity achieved by recording at a higher bit density.

Another way of recovering phase encoded binary data can be practiced without clock pulses recorded on the tape. Briefly, the original phase encoded data signal read from the tape is delayed by one-half of a bit cell and the delayed signal is subtracted from the original signal. The binary value of the data is then determined by the time interval between zero crossings of the difference signal. Accordingly, the tape transport speed is critical to a proper determination of the binary values.

SUMMARY OF THE INVENTION.

The invention contemplates recovering phase encoded binary data from a storage medium in an improved fashion that functions effectively despite variations in transport speed and pulse crowding. In reading the data from the medium, a read signal is produced that includes data pulses at regular intervals and phase pulses between at least some of the data pulses. Upon the occurrence of each data pulse, a blanking pulse is generated of shorter duration than the interval between successive data pulses and longer duration than the interval between a data pulse and the following phase pulse. The read signal is transmitted to a utilization device only in the absence of the blanking pulses, thereby eliminating the unwanted phase pulses.

An important feature of the invention is the control of the width of the blanking pulses in accordance with variations in the duration between data pulses which would occur from variations in transport speed. Specifically, the blanking pulses are generated by a monostable multivibrator that is triggered by each data pulse. The duration of the quasi-stable state of the multivibrator is determined by a buffered direct-current control voltage that is derived from the multivibrator output. Thus, a closed-loop control system is formed that maintains a predetermined ratio between the duration of the blanking pulses and the duration of the average interval between data pulses. In this manner, the width of the blanking pulses is adjusted to follow variations in transport speed to blank out the phase pulses most effectively without overlapping the data pulses in the face of pulse crowding.

If the data pulses are in unipolar, single-channel form when they are transmitted to the utilization circuit, they represent clock pulses that can be employed to recover the phase encoded binary data or to perform some other function. If the data pulses are in bipolar, single-channel or unipolar, two-channel form when they are transmitted to the utilization circuit, they represent the phase encoded binary data per se, shorn of the phase pulses.

BRIEF DESCRIPTION OF THE DRAWINGS

The features of a specific embodiment of an invention are illustrated in the drawings, in which.

DESCRIPTION OF A SPECIFIC EMBODIMENT

Figure 1:
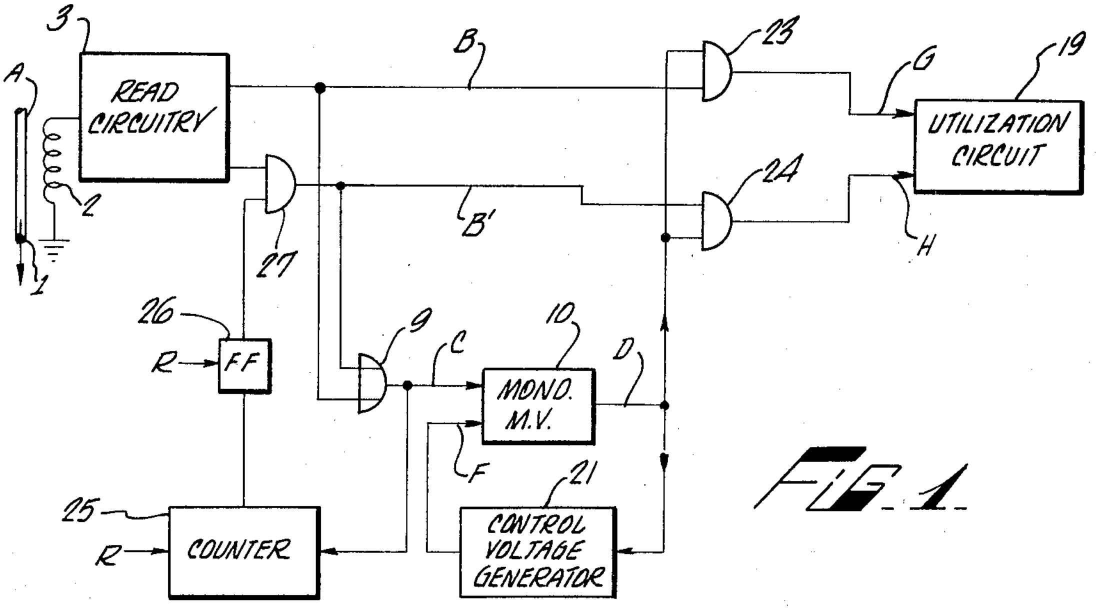
FIG. 1 is a schematic block diagram of circuitry incorporating the principles of the invention.
Figure 4:
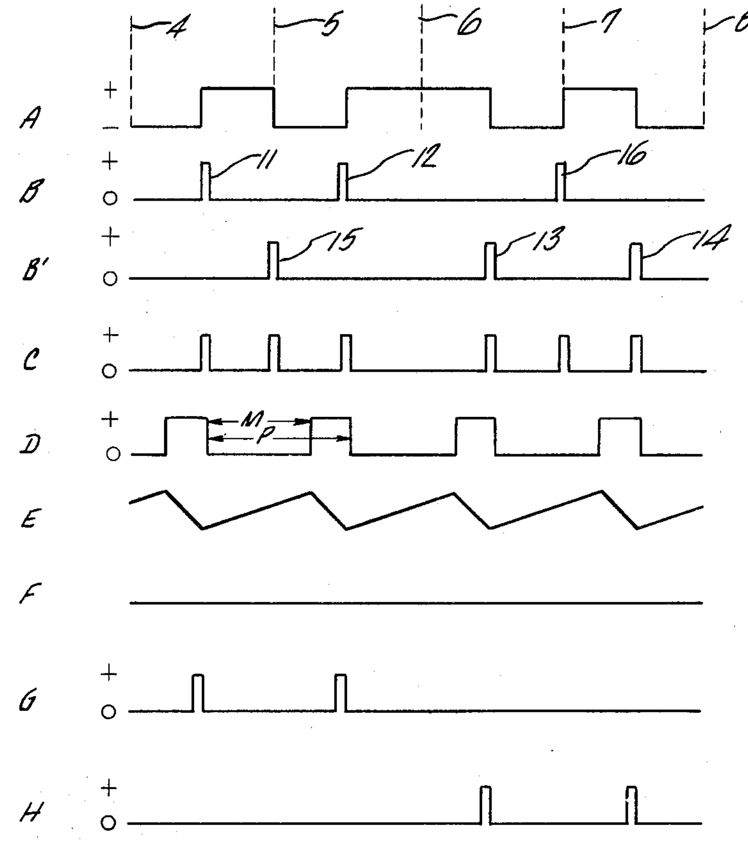
FIG. 4 represents typical wave forms appearing at various points in the circuitry of FIGS. 1 and 3.

Reference is now made to FIG. 1, in which circuitry for recovering phase encoded binary data is shown and to FIG. 4, in which typical wave forms appearing at various points in the circuitry of FIG. 1 are shown. The points in FIG. 1 where the wave forms of FIG. 4 appear, are marked by capital letters corresponding to the capital letters designating the wave forms in FIG. 4. In FIG. 1, a length of magnetic tape 1 is transported past a read head 2 by conventional means not shown. The orientation of the magnetic flux within four bit cells on the surface of tape 1 is represented in FIG. 4 by wave form A. The data consisting of the binary values 1100 is phase encoded on tape 1 in the form of nonreturn-to-zero pulses. The boundaries of the bit cells are marked by vertical dashed lines 4, 5, 6, 7, and 8. The binary value "1" is stored as a negative-to-positive transition in the orientation of flux at the center of a bit cell, and the binary value "0" is stored as a positive-to-negative transistion in the orientation of flux at the center of a bit cell. Read head 2, which senses the flux reversals on the surface of tape 1, is coupled to read circuitry 3. As illustrated in FIG. 7–10(c) on page 333 of the above-mentioned Richards text, read head 2 produces an approximately sinusoidal read head signal that undergoes a phase shift each time the binary value recorded on tape 1 changes. On one channel, read circuitry 3 generates unipolar pulses, represented by wave form B in FIG. 4, that correspond to the positive peaks of the read head signal. On the other channel, read circuitry 3 generates unipolar pulses, represented by wave form B' in FIG. 4, that correspond to the negative peaks of the read head signal. Preferably, the circuit arrangement disclosed in an application of Michael I. Behr, Charles E. Bickle, and Lewis B. Coon, entitled "Binary Data Handling System," Ser. No. 668,529, assigned to the assignee of the present application, and filed concurrently herewith is employed as read circuitry 3.

As illustrated by wave forms B and B' in FIG. 4, some of the recovered pulses, hereinafter called data pulses, directly indicate by the channel on which they appear the binary value recorded in the bit cells of magnetic tape 1 while other pulses, hereinafter called phase pulses, result from the peculiar nature of the phase encoding technique and do not indicate directly the binary value recorded in a bit cell. In wave forms B and B' of FIG. 4, pulses 11, 12, 13, and 14 are data pulses and pulses 15 and 16 are phase pulses. The data pulses occur at regular intervals, that is, one data pulse occurs in each and every bit cell. The phase pulses, however, occur only irregularly. When the sinusoidal signal produced by read head 2 undergoes a phase shift, no phase pulse is produced.

As a result of pulse crowding, the interval between a data pulse and the immediately following phase pulse and the interval between successive data pulses is subject to sudden variation. The variations in tape transport speed, being more gradual, do not exert a large influence on the variation in the interval between a data pulse and its immediately following phase pulse or the interval between successive data pulses. Over a period of time, however, the effect of tap transport speed variations does build up to shift the time of occurrence of the data and phase pulses substantially. Since tape transport speed variations are more gradual than variations due to pulse crowding, they are also easier to compensate for.

Figure 5:
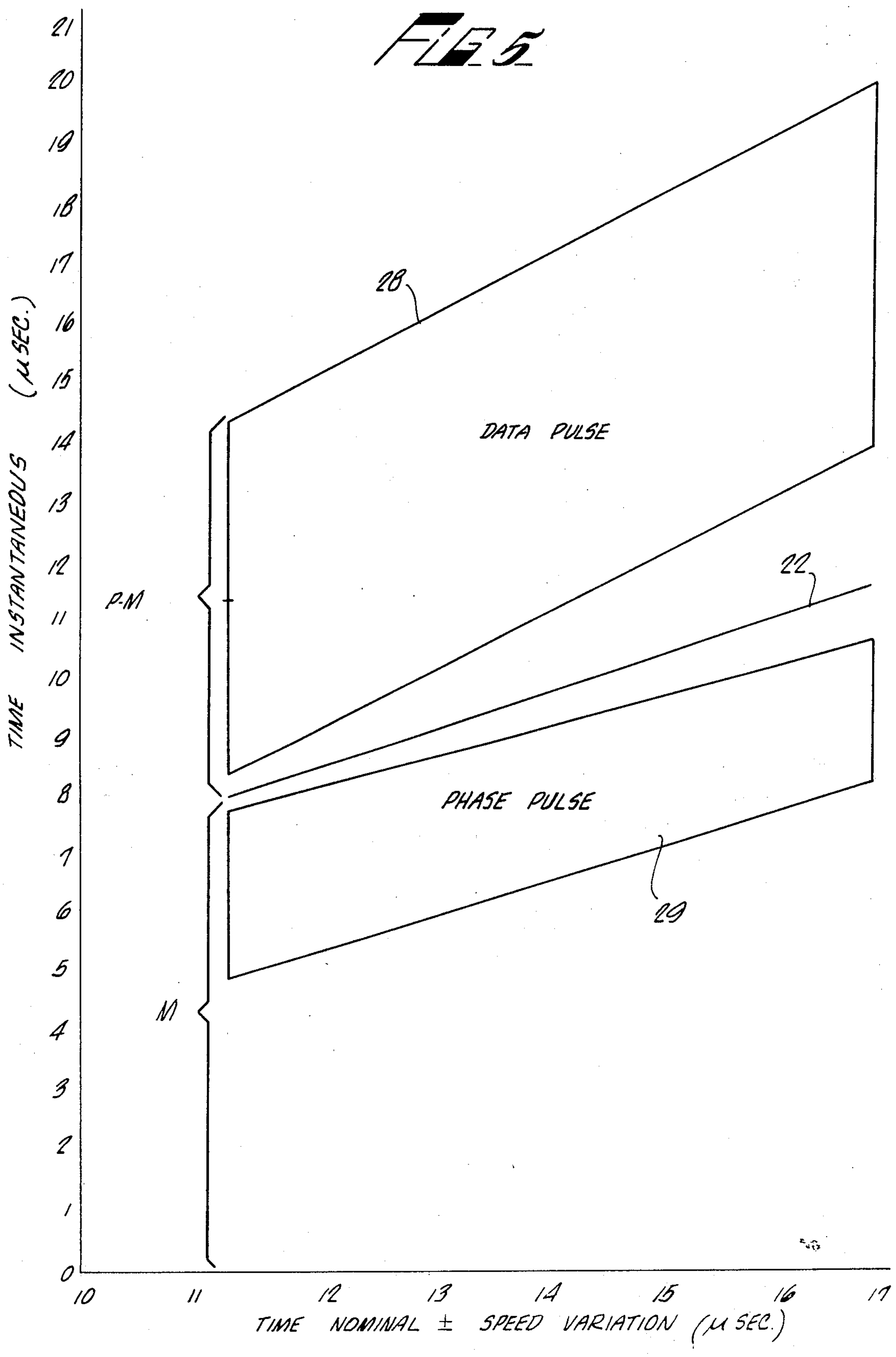
FIG. 5 is a graph illustrating the variations in the time of occurrence of data pulses and phase pulses due to variations in tape transport speed and pulse crowding.

The variation in the time of occurrence of the data and phase pulses is represented in FIG. 5 in which the abscissa is the time duration of a bit cell as tape transport speed varies and the ordinate is the time of occurrence within a bit cell of the data and phase pulses. This graph depicts the uncertainty due to pulse crowding in the time of occurrence of phase and data pulses for the different tape transport speeds encountered in a given system. The data pulses appear within an area 28 and the phase pulses appear within an area 29. A clear line of demarcation exists between the two areas so it is possible to discriminate between data and phase pulses in all cases. By way of example, when the tape speed is such that the time duration of a bit cell is 17 microseconds, the phase pulses would occur between 8 and 10.4 microseconds from the end of the previous data pulse and the data pulses would occur between 13.75 and 19.75 microseconds from the end of the previous data pulse.

The pulses from the channel designated B are coupled through an AND gate 27 to an OR gate 9 where they are combined with the pulses from the channel designated B'. AND gate 27 is energized continuously while the data from tape 1 is being read. The combined pulses, represented by wave form C in FIG. 4, are applied as trigger pulses to a monostable multivibrator 10. Each time a data pulse appears, it triggers multivibrator 10 from its stable state into its quasi-stable state for a time duration shorter than the time interval between successive data pulses and longer than the time interval between a data pulse and the following phase pulse. The output of monostable multivibrator 10 is represented by wave form D in FIG. 4. In its quasi-stable state, multivibrator 10 produces ground pulses at its output whose duration is designated M on wave form D. The period of the operation cycle of multivibrator 10, which is equal to the interval between successive data pulses, is designated P on wave form D. The ground pulses produced by multivibrator 10 in its quasi-stable state serve as blanking pulses to, so to speak, blank out the phase pulses in the signal produced by read circuitry 3. To this end, the output of multivibrator 10 is coupled to one input of an AND gate 23 and one input of an AND gate 24. The pulses generated by read circuitry 3 on one channel are coupled to the other input of AND gate 23 and the pulses generated by read circuitry 3 on the other channel are coupled to the other input of AND gate 24. As illustrated by wave forms, B, B', and D in FIG. 4, the blanking pulses extend from the end of each data pulse to a point in time beyond the phase pulse that immediately follows it. The transmission of phase pulses through gates 23 and 24 is therefore prevented. Consequently, the data pulses are transmitted by gates 23 and 24 to a utilization circuit 19 shorn of the phase pulses, as illustrated by wave forms G and H in FIG. 4. These data pulses designate by the channel on which they appear binary values. In other words, they represent the binary information recorded on tape 1.

The duration of the blanking pulses and period of multivibrator 10 are adjusted responsive to variations in the speed of tape transport to maintain the proper phase relationship with the read signal. The period of multivibrator 10 is adjusted by virtue of the fact it is triggered by the trailing edge of the data pulses. The duration of the blanking pulses is adjusted by a control loop. Specifically, the output of multivibrator 10 is applied to a control voltage generator 21 that produces a voltage proportional to the ratio of the duration of the quasi-stable state to the duration of a period of multivibrator 10, i.e., $M/P$. The voltage produced by generator 21 is buffered so the average voltage is applied to multivibrator 10 to regulate the duration of its quasi-stable state. As the speed of tape transport varies, the duration of quasi-stable state of multivibrator 10 is continually adjusted to reflect these tape speed variations, maintaining the ratio $M/P$ constant. For the most part, the effects of pulse crowding are averaged out so the control loop is not responsive thereto. Pulse crowding effects are basically taken into account by proper selection of the ratio $M/P$ initially so each blanking pulse triggered by a data pulse terminates safely in the time interval between the following phase pulse and the successive data pulse. This insures that in every case the blanking pulses are sufficiently long to extend beyond the phase pulses without overlapping into the succeeding data pulse. In terms of the graph of FIG. 5, the described control of multivibrator 10 maintains the termination of the blanking pulses at a point between the areas (28 and 29) occupied by data pulses and phase pulses for all values of tape transport speed. Line 22 depicts the time of termination of the blanking pulses.

At the beginning of each block of data on tape 1, a special series of binary values is recorded before data in order initially to synchronize the operation of multivibrator 10 to the occurrence of data pulses. This special series, which is called a preamble in the art, must be of sufficient duration to enable a steady state condition to be established in the control loop comprising multivibrator 10 and control voltage generator 21. The preamble is a series of a predetermined number of binary "0's". Thus, all the data pulses appear on the channel designated B′, and all the phase pulses appear on the channel designated B. At the start of each block while the beginning of the preamble is being read, the state of a flip-flop 26 is such that AND gate 27 is not energized. Accordingly, only data pulses appear at the output of OR gate 9. After a predetermined number of data pulses sufficient to establish a steady state condition in the control loop are registered by a counter 25, counter 25 generates a pulse that sets flip-flop 26. AND gate 27 is thereby energized and transmits pulses from the channel designated B. AND gate 27 remains energized until the block of data is completely read, at which time flip-flop 26 and counter 25 are reset responsive to a mark on tape 1 in preparation for the next block of data.

Figure 2:
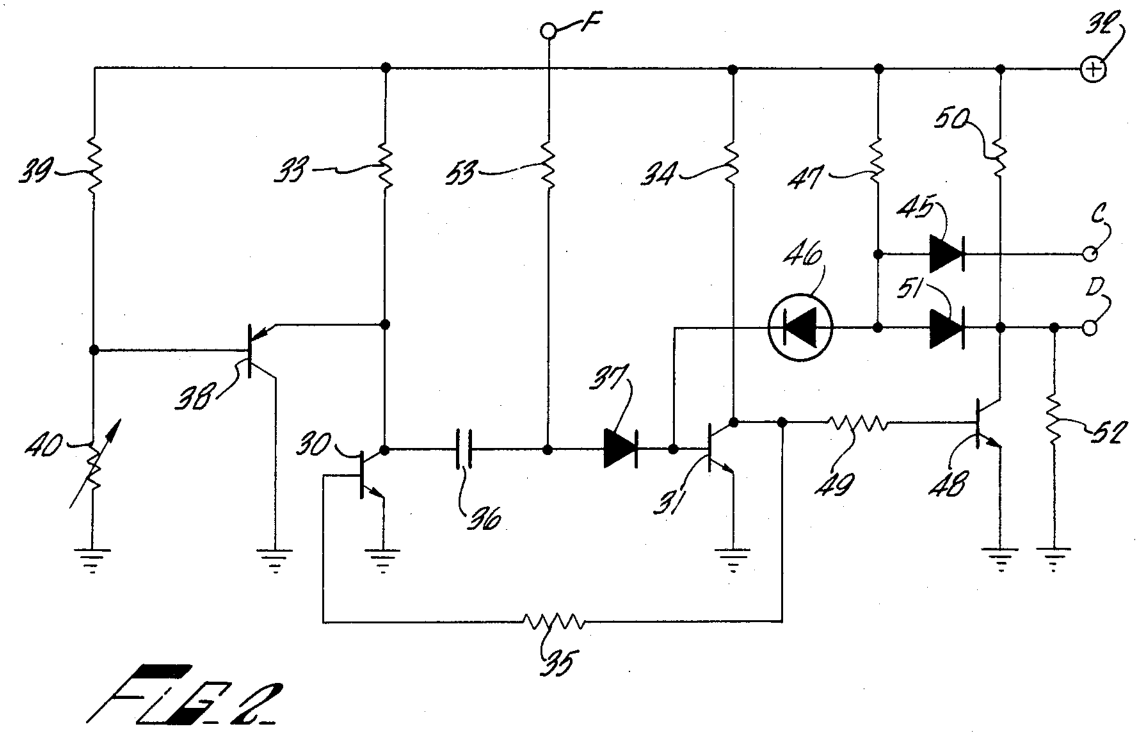
FIG. 2 is a circuit schematic diagram of the monostable multivibrator shown in block form in FIG. 1.

Reference is now made to FIG. 2 in which a circuit diagram of multivibrator 10 is shown. Transistors 30 and 31, which are connected in the grounded emitter configuration, serve as the switching elements of multivibrator 10. The collectors of transistors 30 and 31 are connected to a source 32 of positive potential by load resistors 33 and 34, respectively. A resistor 35 provides cross-coupling from the collector of transistor 31 to the base of transistor 30, while a capacitor 36 and a diode 37 in series provide cross-coupling from the collector of transistor 30 to the base of transistor 31. The collector of transistor 30 is clamped to a predetermined, adjustable potential by an arrangement comprising a transistor 38 having a grounded collector. A voltage divider is formed by a resistor 39 connected between source 32 and the base of transistor 38 and a variable resistor 40 connected between the base of transistor 38 and ground. The emitter of transistor 38 is directly connected to the collector of transistor 30. The value of the predetermined clamping potential on the collector of transistor 30, which affects the duration of the quasi-stable state, is determined by the adjustment of variable resistor 40.

Trigger pulses appearing at point C are applied through a conventional diode 45 and a high storage diode 46 to the base of transistor 31. A resistor 47 connects the junction of diodes 45 and 46 to source 32. The output stage of the multivibrator is formed by a transistor 48 with a grounded emitter. The collector of transistor 31 is coupled to the base of transistor 48 by a resistor 49. A resistor 50 is connected between the collector of transistor 48 and source 32. A diode 51 is coupled between the collector of transistor 48 and the junction of diode 46 and resistor 47. The output voltage of the multivibrator is developed across a load resistor 52 connected between point D (the collector of transistor 48) and ground. The time duration in which the multivibrator remains in its quasi-stable state after a trigger pulse is applied at point C is controlled by the voltage appearing at point F, which is coupled by a resistor 53 to the junction of capacitor 36 and diode 37.

When the multivibrator is in its stable state, transistor 31 is biased such that it is saturated. As a result, its collector is substantially at ground potential and transistor 30 is cut off by virtue of cross-coupling resistor 35. Transistor 48 of the output stage is also cut off so a high positive potential exists at point D. Capacitor 36 becomes charged in the stable state so a voltage drop exists from the collector of transistor 30 to the base of transistor 31. Upon the application of a trigger pulse at point C, the quasi-stable state is initiated. Transistor 31 becomes cut off and its collector voltage rises. Consequently, the base voltage of transistor 30 rises to bring it into conduction. This causes the collector of transistor 30 to drop essentially to ground potential. A corresponding voltage drop is transmitted through capacitor 36 so a negative potential appears at the base of transistor 31, thereby cutting it off. When transistor 31 becomes cut off, transistor 48 becomes saturated and the voltage at point D drops substantially to ground potential. Diode 46 has sufficient capacitance associated with it to maintain the effect of the trigger pulse until the described transition of the multivibrator into the quasi-stable state is completed. After the quasi-stable state is established, capacitor 36 charges through resistor 53 toward the voltage at point F until the potential at the base of transistor 31 again becomes positive. At this time, the multivibrator returns to its stable state, transistor 31 becoming saturated and transistor 30 becoming cut off.

The time required for capacitor 36 to charge to the point where the base of transistor 31 becomes positive depends upon the magnitude of the positive voltage toward which it charges. The larger the positive voltage toward which capacitor 36 charges, the shorter is the time duration that elapses before the base of transistor 31 becomes positive, i.e., the quasi-stable state.

Figure 3:
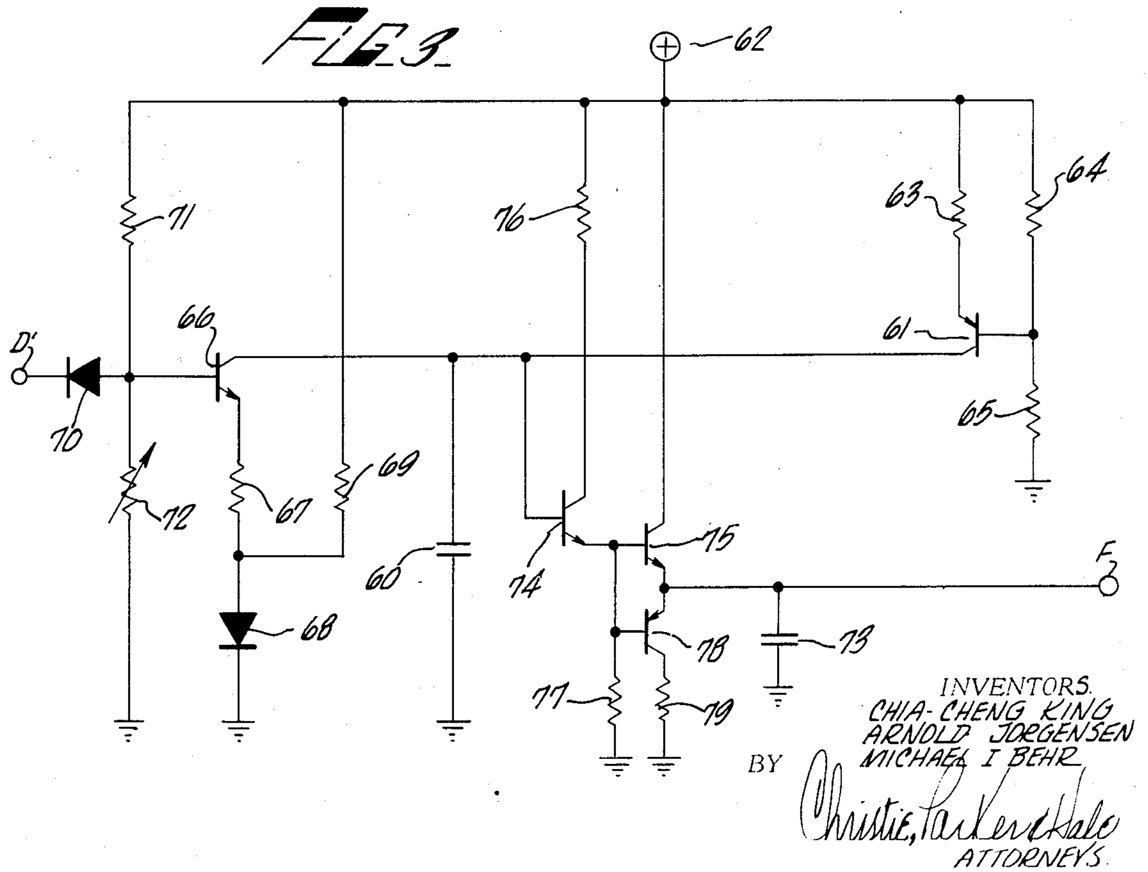
FIG. 3 is a circuit schematic diagram of the control-voltage generator shown in block form in FIG. 1.

Reference is now made to FIG. 3 in which a circuit diagram of control voltage generator 21 is shown. Basically, the voltage employed to control the duration of the quasi-stable state of multivibrator 10 is generated by charging a control capacitor 60 at a constant rate during the quasi-stable state of multivibrator 10 and discharging capacitor 60 at a constant rate during the stable state of multivibrator 10. The voltage across capacitor 60 is represented by wave form E in FIG. 4. A substantially constant charging current is provided to capacitor 60 from the collector of a transistor 61. The emitter of transistor 61 is connected to a source 62 of positive potential by a resistor 63. A resistor 64 is connected between source 62 and the base of transistor 61 and a resistor 65 is connected between the base of transistor 61 and ground. The collector of a transistor 66 is also connected to capacitor 60. A resistor 67 and a diode 68 are connected in series between the emitter of transistor 66 and ground. A resistor 69 is connected between the junction of resistor 67 and diode 68 and source 62. The output D of multivibrator 10 is coupled through a diode 70 to the base of transistor 66. A fixed resistor 71 and a variable resistor 72 form a voltage divider between source 62 and ground. The junction of resistors 71 and 72 is connected to the base of transistor 66. During the quasi-stable state, point D is substantially at ground potential and transistor 66 is cut off. Therefore, the constant charging current from the collector of transistor 61 causes the voltage across capacitor 60 to rise linearly. When multivibrator 10 assumes its stable state, the potential at point D rises and transistor 66 conducts. A constant current discharge path from capacitor 60 is then established through transistor 66 to ground, causing the voltage across capacitor 60 to drop linearly. The value of the constant discharge current is regulated by adjusting variable resistor 72.

An output capacitor 73 of substantially larger value than capacitor 60 is connected between point F and ground. Capacitor 60 is coupled to capacitor 73 through NPN transistors 74 and 75 so that the voltage across capacitor 73 represents the average voltage appearing across capacitor 60. Wave form F in FIG. 4 represents the voltage appearing across capacitor 73. The base of transistor 74 is directly connected to capacitor 60 and its collector is connected through a resistor 76 to source 62. A direct connection exists between the emitter of transistor 74 and the base of transistor 75 and between the collector of transistor 75 and source 62. A resistor 77 is connected between the emitter of transistor 74 and ground. As the voltage across capacitor 60 increases, a charging current is applied through transistors 74 and 75 to capacitor 73 so the voltage across it follows the increase. The emitter and base of a PNP transistor 78 are directly connected to the emitter and base, respectively, of transistor 75. The collector of transistor 78 is coupled through a resistor 79 to ground. When the voltage across capacitor 60 decreases, transistor 78 is rendered conductive and provides a discharge path for capacitor 73 to ground. As a result of the arrangement of transistors 74, 75, and 78, the voltage across capacitor 73 follows both increases and decreases in the voltage across capacitor 60, thereby representing its average value.

Multivibrator 10 and control voltage generator 21 function as a control loop that maintains constant *M/P*, the ratio of the duration of the quasi-stable state of multivibrator 10 to the period of multivibrator 10. Whenever the speed of tape transport varies, the period, P, of multivibrator 10 also varies and the ratio deviates slightly from its preset value determined by the adjustment of resistor 72 (FIG. 3). In such case the time duration in which capacitor 60 discharges changes, thereby causing a variation in the average voltage across capacitor 60. This is reflected by the voltage at point F. In general the voltage at point F is unaffected by pulse crowding because these effects are averaged out. The voltage change at point F readjusts the duration, M, of the quasi-stable state of multivibrator 10 so as to reduce the deviation from the predetermined ratio. For example, as the tape speed increases, the period of multivibrator 10 decreases so that capacitor 60 discharges over a shorter interval of time during each period. Thus, the average voltage across capacitor 60 increases, which is followed by the voltage at point F. An increase in voltage at point F however causes capacitor 36 (FIG. 2) to discharge faster to the point where transistor 31 begins to conduct. Accordingly, the duration of the quasi-stable state of multivibrator 10 decreases. This action continues until the predetermined ratio is re-established, at which time the control system is in equilibrium and the voltage at point F remains constant until the tape transport speed varies again.

The application of the invention is not limited to magnetic tape. Other types of storage mediums, for example, a magnetic drum, can also be utilized.

Many variations from the described embodiment are encompassed by the invention. For example, a single channel bipolar system could be used instead of the two-channel system disclosed, or clock pulses could be produced to recover the data (or for some other purpose) by combining the outputs of AND gates 23 and 24 in utilization circuit 19. Further, INHIBIT gates responsive to the complementary output of multivibrator 10 could be substituted for AND gates 23 and 24.

What is claimed is:

1. A binary data handling system comprising:

a storage medium on which phase encoded binary data is stored;

means for reading the data from the medium, the reading means producing a signal including data pulses at regular intervals and phase pulses between at least some of the data pulses;

a monostable multivibrator assuming either a stable state or a quasi-stable state;

a direct-current control voltage source representative of the ratio of the duration of the quasi-stable state to the duration of the period of the multivibrator;

the multivibrator having a timing capacitor and resistor connected in series across the control voltage source so the voltage across the capacitor changes toward the control voltage in the quasi-stable state, the multivibrator switching from the quasi-stable state to the stable state when the voltage across the capacitor reaches a predetermined value so the duration of the quasi-stable state remains shorter than the interval between successive data pulses and longer than the interval between a data pulse and the following phase pulse;

means responsive to each data pulse for switching the multivibrator from the stable state to the quasi-stable state;

utilization means; and means for transmitting the signal produced by the reading means to the utilization means only during the stable state of the multivibrator.

2. The system of claim 1, in which the reading means produces signals on two channels including unipolar data pulses, the channel on which they appear indicating their binary values, and phase pulses; and the signal transmitting means transmits only the data pulses to the utilization means to the exclusion of the phase pulses.

3. The combination of claim 1, in which the storage medium is magnetic tape that moves relative to the reading means as the binary data is being read so that the duration of the quasi-stable state of the multivibrator changes in accordance with the variations in speed of the movement between the tape and the reading means.

4. In a binary data handling system, the combination comprising:

- a storage medium on which phase encoded binary data is stored;
- means for reading the data from the medium, the reading means producing a signal including data pulses at regular intervals and phase pulses between at least some of the data pulses;
- a monostable multivibrator that assumes a quasi-stable state for a duration of time responsive to the data pulses, and then returns to a stable state, the duration of the quasi-stable state being dependent upon the magnitude of an applied direct current control signal, the duration of the quasi-stable state being shorter than the interval between successive data pulses and longer than the interval between a data pulse and the following phase pulse;
- means for generating a direct current signal representative of the ratio of the duration of the quasi-stable state to the duration of the period of the multivibrator;
- means for applying the generated direct current signal to the multivibrator as the control signal to maintain constant the ratio of the duration of the quasi-stable state to the duration of the period as the period varies;
- utilization means; and
- means for transmitting the signal produced by the reading means to the utilization means only during the stable state of the monostable multivibrator.

5. The system of claim 4, in which the means for generating a direct current signal includes a control capacitor; means for charging the control capacitor while the multivibrator is in one state and for discharging the control capacitor while the multivibrator is in the other state, and means for developing as the control signal a signal that is proportional to the average voltage across the control capacitor.

6. The system of claim 5, in which the control capacitor is charged by a constant current source and is discharged through a constant current discharge path.

7. The system of claim 6, in which the constant current discharge path is adjustable.

8. The system of claim 6, in which the constant current source is continuously coupled to the control capacitor and the constant current discharge path is connected to the control capacitor only while the multivibrator is in one state.

9. The system of claim 8, in which means are provided for connecting the constant current discharge path to the control capacitor while the multivibrator is in its stable state.

10. The system of claim 5, in which the means for developing a signal that is proportional to the average voltage across the control capacitor is an output capacitor having a substantially larger capacitance than the control capacitor, and a coupling network is provided for charging and discharging the output capacitor responsive to the voltage across the control capacitor.

11. The system of claim 10, in which the coupling network comprises first and second transistors of one conductivity type operating in tandem between the first capacitor and the output capacitor; and a third transistor of the opposite conductivity type having a base directly connected to the base of the second transistor, an emitter directly connected to the emitter of the second transistor, and a collector connected to a minimum reference potential such that the output capacitor charges through the first and second transistors and discharges through the third transistor.

12. The system of claim 10, in which the first and second transistors are NPN and the third transistor is PNP.

* * * * *